Patented Apr. 22, 1930

1,755,616

UNITED STATES PATENT OFFICE

ROBERT T. VANDERBILT, OF NEW YORK, N. Y., ASSIGNOR TO R. T. VANDERBILT COMPANY, INCORPORATED, OF NEW YORK, N. Y., A CORPORATION OF NEW YORK

PROCESS OF COLORING CLAY

No Drawing.   Application filed May 5, 1927. Serial No. 189,177.

This invention relates to methods of coloring clay or earthy material, and more particularly to a method of coloring clay in a dry state.

Heretofore in coloring clay or clayey material it has been placed in a slip with water and a dye added to the solution. I have found that clay either dry or partly dry and in lump form may be colored by adding the dye to the clay after or during its passage through a crushing-drying process, and then passing the mixture through a pulverizer or mill.

By observing certain precautions in practicing the process the clayey material and dye may be so thoroughly mixed that the result is fully as good as when the dye is added to clay in a wet state. Even if each particle of the clay is not dyed, the dyed particles are spread so thoroughly through the mixture that uniformity of appearance is obtained in the final product.

According to my process the clayey material in its natural state is preferably fed through a crushing and drying process and the lumps collected in the feed tank of the pulverizer or mill. The dye is added to the material in the proper proportions either before or after the drying process and before it enters the feed tank of the pulverizer. The mixture is then fed to the mill or pulverizer. Any type of mill may be employed to pulverize the clay and mix the dye with it, but I prefer to use a Raymond roller mill which operates on an air-floating system. In this machine the finer particles are constantly withdrawn by suction, and the coarser particles remain in the machine until they are reduced sufficiently to be carried over by the suction system. The mixture of pulverized clay and coloring material is then allowed to accumulate in a bagger tank to effect a more thorough mixing. In this way the dye and clayey material are submitted to three mixing operations, in the mill feed, in the mill and in the bagger tank.

In a typical embodiment of the invention, a good grade of clayey material is delivered to a crushing-drying plant at such a rate that the discharge from the dryer will amount to three tons per hour, or one hundred (100) pounds per minute. Dry acid blue B is added at the rate of .0375 lbs. per ton of clay. A solution of the dye in plain water is first prepared of such strength that 2.5 gals. of the solution are added to each ton of clay or clayey material.

The clay is discharged from the system in lump form, the size of the lumps being preferably ¼ in. or less. The process, however, is in no way dependent on the size of the lumps treated, and clay in larger or smaller lumps may be treated according to the process. The material discharged from the dryer in lump form is delivered to the mill feed tank at a constant rate, and the coloring solution is sprayed on the material in the proper proportion at the dryer discharge and before it enters the mill feed tank. At least six tons of the mixture is allowed to accumulate in the mill feed tank before the material is fed to the mill, thus giving the first mixing of the clay and dye while the clay is in lump form.

The mixture is then passed through a mill or pulverizer which may be of the type referred to above, or any similar type of machine. In the mill the clay is pulverized and the agitation within the mill results in a substantially uniform distribution of the dyed particles throughout the clay. The pulverized dyed clay is then collected in a bagger tank and is again permitted to accumulate until at least six tons are present in the tank before it is withdrawn and shipped. Samples of the product may be taken at desired intervals in order to inspect the product for uniformity.

In practicing the process, the best results are obtained if certain precautions are observed. The rate of discharge of the dryer should be uniform and the rate of delivery of the coloring solution by the sprayer should also be uniform. The feed of the two materials to the mill feed tank should be checked at definite intervals in order that variations may be kept to a minimum. In passing through the dryer there is a loss of 2% of material which is offset by the approximate 2% of moisture left in the finished product.

The number of pounds of wet feed clay material to be delivered to the dryer in order to maintain a uniform discharge rate can thus be determined by determining the moisture content of the wet clay material, and offsetting the loss of material by the approximately equal amount of moisture left in the finished product. The moisture introduced with the dye is evaporated by the clay which has been heated during the crushing and drying operations.

I claim:

1. The method of coloring clay, which comprises breaking up the clay into lumps, spraying the clay in lump form with a solution of a dye to color part of the clay particles of the clay lumps, and thereafter pulverizing the clay lumps and thoroughly mixing the dyed clay particles with the undyed particles to effect substantially uniform distribution of the dyed particles throughout the clay and to give a final pulverized clay product of substantially uniform appearance.

2. The method of coloring clay, which comprises drying and crushing the clay to form dried clay lumps, applying to the dried clay lumps a solution of a dye to color part of the clay particles of the clay lumps, and thereafter pulverizing the dried and dyed clay lumps and thoroughly mixing the pulverized product to effect substantially uniform distribution of the dyed particles throughout the clay.

3. The method of coloring clay, which comprises crushing and drying the clay to produce a dried clay product in lump form, spraying a solution of a dye on to the dried clay lumps while they are still hot from the drying operation and thereby coloring part of the clay particles of the clay lumps and thereafter pulverizing the clay lumps and thoroughly mixing the pulverized clay to effect substantially uniform distribution of the dyed particles throughout the clay.

4. The method of coloring clay, which comprises crushing the clay and drying it to form a dried clay product in lump form, accumulating the dried lump clay material before pulverizing, pulverizing the accumulated clay material and thoroughly mixing the pulverized clay, and accumulating a body of the pulverized clay, and spraying the clay while in lump form and prior to the pulverizing operation with a solution of a dye to color part of the clay particles of the clay lumps, the accumulation of the body of dyed lumps before pulverizing together with the pulverizing operation and the accumulation of the pulverized material effecting a substantially uniform distribution of the dyed clay particles throughout the clay.

In testimony whereof I affix my signature.

ROBERT T. VANDERBILT.